United States Patent
Bunke et al.

[11] Patent Number: 5,853,632
[45] Date of Patent: *Dec. 29, 1998

[54] PROCESS FOR MAKING IMPROVED MICROWAVE SUSCEPTOR COMPRISING A DIELECTRIC SILICATE FOAM SUBSTANCE COATED WITH A MICROWAVE ACTIVE COATING

[75] Inventors: Paul Ralph Bunke; Robert Lawrence Prosise, both of Cincinnati; Phillip Floyd Pflaumer, Hamiltion, all of Ohio

[73] Assignee: The Procter & Gamble Company, Cincinnati, Ohio

[ * ] Notice: The term of this patent shall not extend beyond the expiration date of Pat. No. 5,698,306.

[21] Appl. No.: 580,676

[22] Filed: Dec. 29, 1995

[51] Int. Cl.$^6$ .................................................. C04B 38/00
[52] U.S. Cl. ............................ 264/42; 264/45.1; 264/48
[58] Field of Search ............................... 264/42, 45.1, 48

[56] References Cited

U.S. PATENT DOCUMENTS

| | | | |
|---|---|---|---|
| 3,184,371 | 5/1965 | Seidl | 264/42 |
| 3,844,804 | 10/1974 | Horai | 106/84 |
| 3,933,514 | 1/1976 | Banks | 106/84 |
| 4,057,608 | 11/1977 | Hashimoto | 264/42 |
| 4,641,005 | 2/1987 | Seiferth | 219/10.55 E |
| 4,703,148 | 10/1987 | Mikulski et al. | 219/10.55 E |
| 4,970,358 | 11/1990 | Brandberg et al. | 219/10.55 F |
| 4,985,606 | 1/1991 | Faller | 219/10.55 E |
| 5,019,681 | 5/1991 | Lorence et al. | 219/10.55 F |
| 5,041,295 | 8/1991 | Perry et al. | 426/107 |
| 5,075,526 | 12/1991 | Sklenak et al. | 219/10.55 E |
| 5,106,635 | 4/1992 | McCutchan et al. | 426/107 |
| 5,241,150 | 8/1993 | Garvey | 219/10.55 |
| 5,343,024 | 8/1994 | Prosise et al. | 219/730 |

FOREIGN PATENT DOCUMENTS

| | | | |
|---|---|---|---|
| 0 276 654 | 3/1988 | European Pat. Off. | B05D 5/12 |
| 50-4119 | 1/1975 | Japan | 264/42 |

*Primary Examiner*—James Derrington
*Attorney, Agent, or Firm*—Karen F. Clark; Rose Ann Dabek; Jacobus C. Rasser

[57] ABSTRACT

The present invention provides a process for making an improved thermally insulated microwave silicate foam susceptor. The process for making the improved microwave susceptor comprises the following steps:

a) preparing pourable aqueous alkali metal dielectric sodium silicate slurry, b) pouring said slurry into a smooth surface substrate mold, c) heating said poured slurry at an effective elevated temperature to foam the slurry in said mold;

d) drying said foam at an effective elevated temperature to provide said dry silicate foam substrate having a substantially smooth surface;

e) coating at least a portion of said substantially smooth surface with an effective amount of a flowable microwave active material coating (MAC) and drying said flowable coating at an effective temperature to form a dry layer of said MAC.

32 Claims, 6 Drawing Sheets

PROCESS FOR MAKING IMPROVED MICROWAVE SUSCEPTOR COMPRISING A DIELECTRIC SILICATE FOAM SUBSTANCE COATED WITH A MICROWAVE ACTIVE COATING

BACKGROUND OF THE INVENTION

1. Field of the Invention

The present invention relates to microwave field modifiers, and more particularly, to such modifiers which generate a significant amount of heat, i.e., susceptors. Specifically, the present invention relates to susceptors consisting of an electrically active coating material coated on a dielectric substrate.

2. Description of the Prior Art

Microwave ovens possess the ability to heat, cook or bake items, particularly foodstuffs, extremely rapidly. Unfortunately, microwave heating also has its disadvantages. For example, microwave heating alone often fails to achieve such desirable results as evenness, uniformity, browning, crispening, and reproducibility. Contemporary approaches to achieving these and other desirable results with microwave ovens include the use of microwave field modifying devices such as microwave susceptors.

Generically, microwave susceptors are devices which, when disposed in a microwave energy field such as exists in a microwave oven, respond by generating a significant amount of heat. The susceptor absorbs a portion of the microwave energy and converts it directly to thermal energy which is useful for example to crispen or brown foodstuffs. This heat may result from microwave induced intramolecular or intermolecular action. It may result from induced electrical currents which result in so-called $I^2R$ losses in electrically conductive devices (also referred to as ohmic heating). The heat may also result from dielectric heating of dielectric material disposed between electrically conductive particles, elements or areas (also referred to as fringe field heating or capacitive heating).

In any event the microwave susceptor absorbs a portion of the microwave energy within the oven cavity, this absorption reduces the amount of microwave energy available to cook the food. Simultaneously, the susceptor makes thermal energy available for surface cooking of the food by conductive or radiant heat transfer. Thus, susceptors tend to slow down direct microwave induction heating to provide some thermal heating which tends to be more uniform and provide such desirable results as browning or crispening.

Currently, the most commercially successful microwave susceptor is a thin film susceptor which heats through the $I^2R$ mechanism resulting in ohmic heating. Typically, thin film susceptors are formed of a thin film of metalized aluminum vacuum deposited on a polyester layer which is adhered to paper or cardboard. This type of susceptor has its limitations. For example, these thin film susceptors provide only moderate heating performance. They do not generate the high heating performance necessary to brown or crispen high moisture content foods. They are not suitable for radiant heating and when not in contact with the food degrade rapidly. Significant degradation occurs when the susceptor degrades during the cooking cycle reducing heat output such that all conduction cooking virtually ceases. More importantly, thin film susceptors are expensive to manufacture and lack the versatility and manufacturing cost advantages that coating materials offer.

Prior Art susceptors are disclosed in U.S. Pat. No. 4,640,838 issued to Isakson et al., on Feb. 3, 1987, U.S. Pat. No. 4,518,651 issued May 21, 1985 to Wolfe, Jr., and U.S. Pat. No. 4,959,516 issued to Tighe et al., on Sep. 25, 1990; a large number of prior art susceptors employ graphite or carbon as the microwave active particle. Although some of these susceptors can reach high temperatures, they tend to suffer from either runaway heating or significant degradation. Runaway heating occurs when such high power is generated over the heating cycle that the temperature rises above desirable limits causing excess browning and possibly combustion. Significant degradation occurs when the susceptor degrades during the cooking cycle reducing heat output such that all conduction cooking virtually ceases.

The present invention offers solutions to the runaway heating and significant degradation problems.

U. S. Pat. No. 5,343,024 issued Aug. 30, 1994 to Prosise et al., discloses a microwave substrate comprising a microwave active coating having a silicate binder and an active; this patent is incorporated herein by reference.

SUMMARY OF THE INVENTION

The present invention provides a process for making an improved thermally insulated microwave silicate foam susceptor. The process for making the improved microwave susceptor comprises the following steps:

a) preparing pourable aqueous alkali metal dielectric silicate slurry, b) pouring said slurry into a smooth surface substrate mold, c) heating said poured slurry at an effective elevated temperature to foam the slurry in said mold;

d) drying said foam at an effective elevated temperature to provide said dry silicate foam substrate having a substantially smooth surface;

e) coating at least a portion of said substantially smooth surface with an effective amount of a flowable microwave active material coating (MAC) and drying said flowable coating at an effective temperature to form a dry layer of said MAC.

BRIEF DESCRIPTION OF THE DRAWINGS

While the specification concludes with claims which particularly point out and distinctly claim the invention, it is believed the present invention will be better understood from the following description of preferred embodiments taken in conjunction with the accompanying drawings, in which like reference numerals identify similar elements.

DESCRIPTION OF THE PREFERRED EMBODIMENTS

Figure 1:
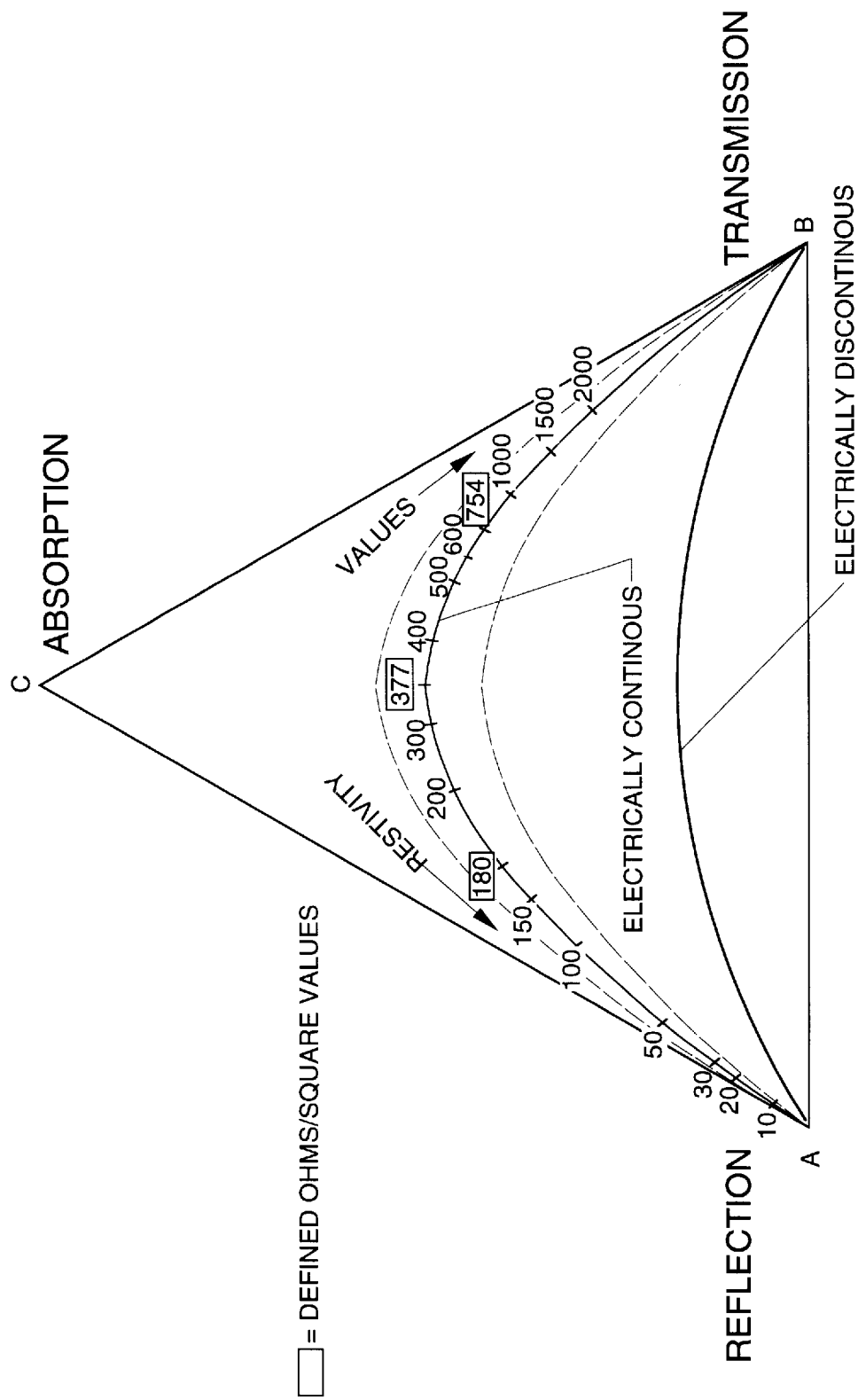
FIG. 1 is a three component diagram illustrating the relationship between absorption, reflection, transmission and approximate resistivity for an electrically continuous layer and for an electrically discontinuous layer.

The present invention provides a process for making an improved thermally insulated microwave silicate foam susceptor. The process for making the microwave susceptor comprises the above summarized steps.

The silicate for both the substrate as well as the MAC is preferably a sodium silicate, but can be other alkali metals can be used. The susceptor of the present invention is capable of quickly reaching and more importantly maintaining extremely high temperatures. This enable it to brown and crispen foods in a microwave oven.

The present invention relates to a unique microwave foamed silicate susceptor comprising a dry silicate foam substrate coated with an effective amount of microwave active coating material. The silicate is preferably a sodium silicate, but can be other alkali metals, and the active constituent is preferably graphite, but other actives can be used. The susceptor of the present invention is capable of quickly reaching and more importantly maintaining extremely high temperatures of as high as 1000° F. (538° C.). This enables brown and crispen food in a microwave oven. Moreover, the susceptor can be formulated such that when a high temperature (200° F.+) is reached, the susceptor maintains it without runaway heating. This is important for cooking certain foods.

Although high cooking temperatures can be reached, the low mass and heat capacity of the susceptor of the present invention allow quick cooling to avoid injury.

The microwave foamed silicate susceptor comprises a dry microwave active coating (MAC) material on a dry silicate foam dielectric substrate. The dry silicate foam is a surprisingly good substrate for a microwave active coating. At least a portion the dry silicate foam has a smooth and uniform surface. The microwave active coating is preferably coated on that smooth and uniform surface.

The Dry Silicate Foam

It is important to formulate the silicate foam (tile) substrate so that it is physically stable for its intended use. In other words the foam (tile) should not be too brittle. Glass fibers or webs and the like can be incorporated within the foam for structural integrity if desired. A dielectric reinforcing material can optionally be used at a level of from about 0.1% to 25% by weight of the dry foam.

The preferred silicate foam is a sodium silicate foam; but other alkali metal silicates can be used. The dry silicate foam of this invention offers several advantages in microwave cooking and baking. The dry silicate foam is non-combustible and is capable of withstanding and maintaining temperatures in excess of 1000° F. (538° C.). It provides thermal insulation for the package which allows for higher temperatures to be reached and maintained. The dry silicate 30 foam has a low specific heat which allows for rapid microwave heating, and has a low thermal heat capacity which reduces the chance of the consumer getting seriously burned. It has a low density which results in a lower package weight. It is moldable and can be used in a variety of packages. It is transparent to microwave energy. The dry silicate microwave foam may be reusable if so desired.

The dry silicate microwave foam includes a silicate. Silicates are generally referred to in terms of

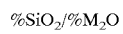

where M may be an alkali metal such as lithium, potassium or sodium. Sodium silicate is the preferred silicate binder. Sodium silicate is commercially available in various weight ratios of $SiO_2:Na_2O$ from about 1.6:1 to about 3.75:1 in water solution. The most preferred sodium silicate has a weight ratio of 3.22:1. A 3.22 sodium silicate powder can be purchased from the PQ Corp. as a "G" Grade Powder with 80.89% solids. A 3.22 sodium silicate can be purchased from Power Silicates Inc., Claymont, Del. as an "F" Grade Solution with about 37% solids. The lower ratios are more alkaline and absorb water more readily making them less desirable. In addition, they are stickier when dry. The higher ratios while feasible, do not seem to be as readily available commercially.

TABLE 1

Dry Foam Substrate Made with a Mixture of G and F Sodium Silicates

| G:F | 40:60 | to | 80:20 |
|---|---|---|---|
| G:F | 55:45 | to | 75:25 |
| G:F | Example | 65:35 | |

The dry foam substrate is made from a dried silicate slurry. There are more details on the slurry below. The moisture level ranges of the dried foam are set out in Table 2.

TABLE 2

The Dry Foam Moisture Level Ranges by Weight of Foam

| Broad Range | 0–25% |
|---|---|
| Preferred | 0–5% |
| More Preferred | 0–2% |

The dry foam silicate substrate is foamed from a wet pre-foam silicate slurry. The slurry is poured into a substrate mold and heated. Some typical dry foam substrate thicknesses are set out in Table 3.

TABLE 3

Dry Foam Substrate Thickness

| Broad Range | 0.05" (0.127 cm) | to | 1.0" (2.54 cm) |
|---|---|---|---|
| Preferred | 0.1" (0.254 cm) | to | 0.7" (1.78 cm) |
| More Preferred | 0.2" (0.508 cm) | to | 0.5" (1.27 cm) |
| Example | 0.3" (0.762 cm) | | |

The aqueous slurry foams and water is driven out. Some preferred pre-foam slurries are set in Table 4.

The Pre-Foam Slurry

The pre-foam slurry and the foam aid of Tables 4 and 5 are illustrative of slurries and foam aid levels used in the process to make dry dielectric foam substrates. The slurry is aqueous. Water is used to provide a uniform mixture of dry and/or wet silicate starting materials.

The water level of the slurry is as low as possible. In the process, the slurry is poured into a substrate mold and dried with heat. Preferably the drying temperature is from about 500° F.±50° F. but any effective elevated temperature can be used that will dry the slurry and provide a dry foam substrate. The process steps are summarized above on the summary on the invention. See Example 4 for more details.

TABLE 4

The Wet Pre-Foam Slurry
Wet Sodium G:F Silicate Ratio Ranges

| | | | |
|---|---|---|---|
| G:F | 25:75 | to | 60:40 |
| G:F | 35:65 | to | 55:45 |
| G:F | Example | | 45:55 |

A foam aid can be added to the pre-foam slurry. The level of a preferred foam aid surfactant is set out in Table 5. Some examples of foam aids are e.g., sodium or potassium lauroyl sarcosinate, alkyl glyceryl ether sulfonate, sulfonated fatty esters, and sulfonated fatty acids.

Numerous examples of other surfactants are disclosed in the literature: they include other alkyl sulfates, anionic acyl sarcosinates, methyl acyl taurates, N-acyl glutamates, acyl isethionates, alkyl sulfosuccinates, alkyl phosphate esters, ethoxylated alkyl phosphate esters, trideceth sulfates, protein condensates, mixtures of ethoxylated alkyl sulfates and alkyl amine oxides, betaines, sultaines, and mixtures thereof. Included in the surfactants are the alkyl ether sulfates with 1 to 12 ethoxy groups, especially ammonium and sodium lauryl ether sulfates.

Many additional foam aid surfactants are described in McCUTCHEON'S, DETERGENTS AND EMULSIFIERS, 1993 Edition, published by MC Publishing Co.

TABLE 5

Wet and Dry Foam Aid (Surfactant) Levels

| | WET | DRY |
|---|---|---|
| | 0–3% | 0–1% |
| | 0.06–0.18% | 0.02–0.06% |
| Example | 0.12% | 0.04% |

The MAC

The microwave active coating (MAC) material includes a silicate binder and an active constitute. The MAC weight ratios of the silicate to active are set out in Tables 6 and 7. The dry layer can be electrically continuous. It can have a surface concentration of the active constituent of about 1.0 gram per square meter or greater and a dry water content of less than 25%, preferably less than 2%. The silicate is preferably a sodium silicate, but can be other alkali metals, and the active constituent is preferably graphite, but other actives can be used.

Tables 6 and 7 illustrate some preferred binder to active ratios of the MAC. It should be understood that all actives are not covered in the tables. It should be understood that actives that have densities between those in Tables 6 and 7, e.g., aluminium, are useful. It should also be understood that for the more dense actives, more will be required than for less dense actives.

TABLE 6

Ratio Ranges for the Sodium Silicate Binder to Active for the MAC
(Carbon, graphite, and similar actives)

| | | |
|---|---|---|
| | Density | 1.7–2.5 g/cc |
| | Range | 98:2–40:60 |
| | Low Heating | 98:2–90:10 |
| | Moderate Heating | 90:10–80:20 |
| | High Heating | 80:20–40:60 |
| Example | High Heating | 60:40–2.1 g/cc |

TABLE 7

Ratio Ranges for the Sodium Silicate Binder to Active for the MAC
(Metals & semi-conductor actives)

| | | |
|---|---|---|
| | Density | 7.5–8.5 g/cc |
| | Range | 98:2–15:85 |
| | Low Heating | 98:2–70:30 |
| | Moderate Heating | 70:30–50:50 |
| | High Heating | 50:50–15:85 |
| Example | High Heating | 35:65–8 g/cc |

In accordance with another aspect of the present invention a microwave susceptor is provided which exhibits moderate as well as high heating performance. This susceptor includes a dry layer of a MAC material. The dry layer of the microwave active coating (MAC) material overlays at least a portion of the substrate for generating low, moderate or high heating performance. The dry layer is electrically continuous and has a surface concentration of the active constituent of about 1.0 gram per square meter or greater.

In accordance with another aspect of the present invention a single serve baking system is provided. This baking system includes a top including a dome shaped foamed silicate susceptor capable of generating and withstanding relatively high baking temperatures. The domed top is adapted for placement over the item to be baked. The domed top preferably cooperates with a base element to form an outer enclosure. The baking system preferably further includes a susceptor located in the area of the base element.

In accordance with another aspect of the present invention a multiple serving baking system is provided. The baking system incorporates a top including a foamed silicate susceptor capable of generating and withstanding relatively high baking temperatures. The foamed silicate susceptor can be a single unit or a plurality of units. Furthermore, a protective layer capable of retaining any dislodged flakes of the dry MAC layer is disposed over the dry MAC layer sandwiching the dry MAC layer between itself and the substrate. The flexible layer is preferably a layer of stable high temperature resistant polymer, such as Teflon™. The top preferably cooperates with a base element to form an outer enclosure. The baking system preferably further includes individual susceptors located in the area of the base element.

In accordance with another aspect of the present invention a microwave frying system is provided. This frying system includes a tray shaped foamed silicate susceptor capable of generating and withstanding relatively high frying temperatures.

Figure 2:
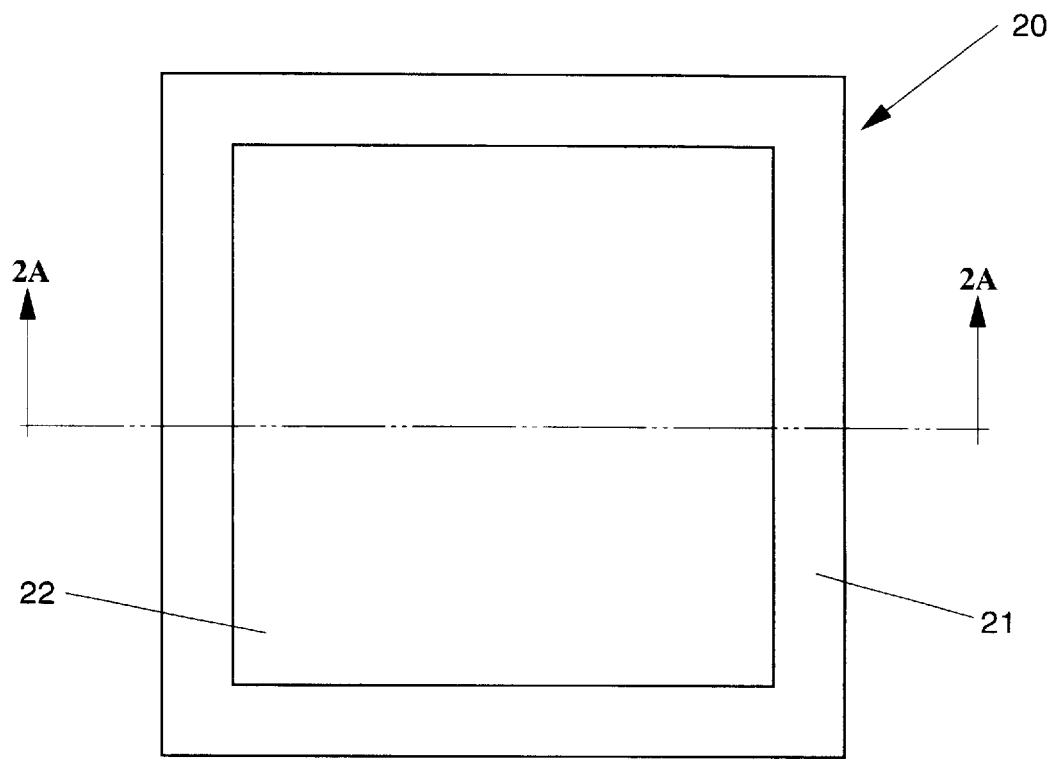
FIG. 2 is a perspective view of a preferred embodiment of a foamed silicate susceptor of the present invention formed into a tile.
Figure 2A:
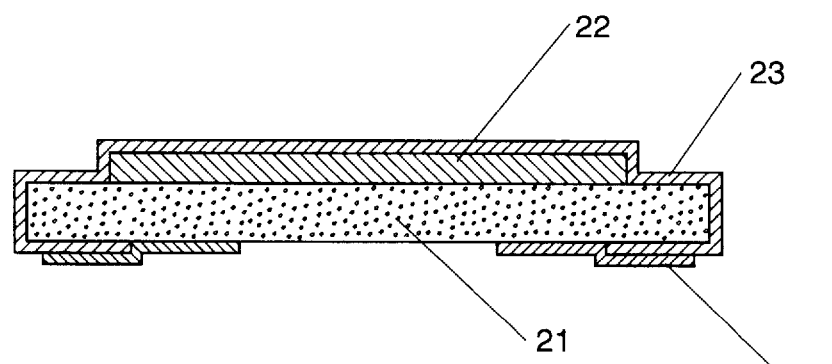
FIG. 2A is an enlarged cross sectional view taken along line 2A—2A of FIG. 2

A preferred foamed silicate susceptor of the present invention formed into a susceptor tile 20 is illustrated in FIG. 2. FIG. 2 shows a sodium silicate foam dielectric substrate 21, a dry layer of a microwave active coating (MAC) 22 overlaying the substrate 21. FIG. 2A is a cross sectional view of FIG. 2, and shows a high temperature barrier film 23 overlaying the substrate 21 and MAC 22. The MAC 22 is generally coated directly on the substrate 21. The MAC 22 includes a silicate binder including a microwave active constituent. The susceptor 20 is formed by coating the MAC 22 onto the foam substrate 21 while in its wet state and allowing it to dry. "Dry" as used herein means having a sufficiently low moisture content such that the composition is in a relatively stable state. The MAC moisture level is preferably about zero. In the case of MAC 22 of this invention this dry state generally occurs below about 25%, preferably below 5% or most preferably below 2%, moisture content. Above about 2% moisture, the resistivity of the susceptor can change with microwave heating. A discussion of how this change may occur will follow. If heating is continued long enough, the resultant susceptor moisture content will drop below about 2%, whereby further significant changes in the resistivity and heating capability will be unaffected by subsequent heating. For higher moisture contents, say in the 15–25% range the change in resistivity after heating may become great enough such that minimal subsequent heating may occur. In other words, thermal shutdown can be made to occur. Also, for intermediate moisture contents, say 2–15%, the change in resistivity after heating may be low enough to allow significant subsequent heating potential to remain. It is realized that the resultant post microwave heating susceptor heating capability and resistivity is a function of its initial moisture content, resistivity, microwave heating time, and microwave field strength; among other variables. The MAC 22 of a foamed silicate susceptor of the present invention is preferably electrically continuous.

Whether the dry layer is electrically continuous or discontinuous can be determined by measuring the reflectance, absorbance and transmittance (Hereinafter RAT values). If the MAC 22 is electrically continuous it will have RAT and surface resistance values which correspond to a specific relationship. This relationship is shown in FIG. 1 as a plot on a three component diagram. To determine if a MAC 22 is electrically continuous, simply perform a RAT test and compare the results to FIG. 1. If the results fall on the curve or plus or minus about fifteen percent thereof (based upon absorption as seen in FIG. 1) due to variability of the measurements, then the MAC 22 is electrically continuous. This method is problematic in cases of extremely high resistivity (i.e. above about 10,000 ohms per square) due to the inability to accurately measure in this range. However, samples of extremely high resistivity tend to heat less effectively.

One method of measuring RAT values uses the following Hewlett Packard equipment: a Model 8616A Signal generator; a Model 8743A Reflection-Transmission Test Unit; a Model 8411A Harmonic Frequency Converter; a Model HP-8410B Network Analyzer; a Model 8418A Auxiliary Display Holder; a Model 8414A Polar Display Unit; a Model 8413A Phase Gain Indicator; a Model S920 Low Power Wave Guide Termination; and two S281A Coaxial Wave guide Adapters. In addition a digital millivolt meter is used.

Connect the RF calibrated power output of the 8616A Signal Generator to the RF input of the 8743A Reflection-Transmission Test Unit. The 8411A Harmonic Frequency Converter plugs into the 8743A Reflection-Transmission Test Unit's cabinet and the 8410B Network Analyzer. Connect the test channel out, reference channel out, and test phase outputs of the 8410B Network Analyzer the test amplitude, reference and test phase inputs, respectively, of the 8418A Auxiliary Display Holder. The 8418A Auxiliary Display Holder has a cabinet connection to the 8414A Polar Display Unit. The 8413A Phase Gain Indicator has a cabinet connection to the 8410B Network Analyzer. The amplitude output and phase output of the 8413 Phase Gain Indicator is connected to the digital millivolt meter's inputs.

The settings of the 8616A Signal Generator are as follows: Frequency is set at 2.450 GHz; the RF switch is on; the ALC switch is on to stabilize the signal; Zero the DBM meter using the ALC calibration output knob; and set the attenuation for an operating range of 11 db. Set the frequency range of the 8410B Network Analyzer to 2.5 which should put the reference channel level meter in the "operate" range. Set the amplitude gain knob and amplitude vernier knob as appropriate to zero the voltage meter readings for reflection and transmission measurements respectively.

Circular susceptor samples are cut to three and one-half inches in diameter for this test procedure. For Reflection place the 8743A Reflection-Transmission Unit in the reflection mode. A S281 Coaxial Wave guide Adapter is connected to the "Unknown" port of the 8743A Reflection-Transmission Test Unit. A perfect shield (aluminum foil) is placed flat between the reflection side of the S281 wave guide adapter and the S290A Low Power Guide Termination. The amplitude voltage is set to zero using the amplitude gain and vernier knobs of the 8410B Network Analyzer.

The shield is replaced by the sample of the susceptor. In other words, the sample is placed between the S281A Coaxial Wave guide Adapter and the S920A Low Power Wave guide Termination and the attenuation voltage is measured. It should be understood that some error may be introduced in wave guide readings made on very thick (>about 0.125 in.) foamed silicate susceptor samples. An alternative is to cut the sample to the exact dimensions of the inner wave guide and place the microwave active side in the plane of the S281A and S920A junction. Another alternative is to produce and test a "substitute" MAC made under identical conditions and compositions on a thinner substrate such as glass or paper.

Normally, four readings are taken per sample and averaged. The samples are rotated clockwise ninety degrees per measurement. After the second measurement the sample is turned over (top to bottom) for the final two measurements. For polarized, isotropic samples care must be taken to orient the samples such that the maximum and minimum readings in millivolts (mv) are obtained. The % R value is calculated from the maximum reading using the equation $$\% R = \text{Log}^{-1}[2(mv)]$$

These samples may also be rotated in increments other than 90°.

For Transmission, place the 8743A Reflection-Transmission Unit in the transmission mode. A 10 db attenuator is placed in the transmission side of the line, between the "In" port of the 8743 Reflection-Transmission Unit and a second S281A Coaxial-Wave guide Adapter. The two S281A Coaxial-Wave guide Adapters are aligned and held together securely. The amplitude signal voltage is zeroed using the amplitude gain and vernier knobs of the 8410B Network Analyzer. The susceptor to be tested is placed between the two wave guide adapters and the attenuation voltage is measured. Four readings in millivolts (mv) are taken as described above for the reflection measurement. Reflection and transmission values should be calculated in the same manner; i.e. average or maximum and using the equation $$\% T = \text{Log}^{-1}[2(mv)]$$

Percent absorption is calculated by subtracting the percent transmission measurement and the percent reflection measurement from 100.

Once the values for absorption, transmission and reflection have been obtained, simply plot the results on the relationship curve of FIG. 1. If the results fall on the curve or within about fifteen percent thereof due to variability of the measurements, then the layer is electrically continuous.

If the results do not fall within this range of the curve then the layer is not electrically continuous. Some susceptors of this invention change in resistivity during exposure to a microwave energy field. Thus, for these susceptors the values for absorption, reflection, transmission and resistance also change during use. As they change they remain electrically continuous, i.e., stay on the curve, but move in the direction of increasing resistivity. It should be noted that some very conductive susceptors may actually become more effective heaters as their resistance increases into the maximum power generation range, i.e. toward A=50%. Other susceptors may decrease in heating as their resistance increases beyond the maximum power generation range.

It should be noted that RAT values as measured in the network analyzer may be different from actual RAT values when a microwave susceptor is placed in competition with a food load. Furthermore, the above method assumes that the RAT values are not altered as a result of the substrate. However, certain substrates such as glass can interfere with the accuracy of these RAT measurements. As previously mentioned the microwave active coating material includes a silicate binder and an active constituent. Silicate binders are generally referred to in terms of

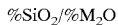

where M may be an alkali metal such as lithium, potassium or sodium. Sodium silicate is the preferred silicate binder. Sodium silicate is commercially available in various weight ratios of SiO2:Na2O from about 1.6:1 to about 3.75:1 in water solution. The most preferred sodium silicate has a weight ratio of 3.22:1. A 3.22 sodium silicate can be purchased from Power Silicates Inc., Claymont, Del. as an "F" Grade Solution with about 37% solids. The lower ratios are more alkaline and absorb water more readily making them less desirable. In addition, they are stickier when dry. The higher ratios while feasible, do not seem to be as readily available commercially.

The active constituent can be particles of carbon, graphite, metals, semiconductors or a combination thereof; preferably carbon or graphite; more preferably graphite; and most preferably synthetic graphite. Graphite generates significant heat flux and has less of an arcing problem than the higher conductive actives such as metals. Synthetic graphite does not have some of the natural impurities found in natural graphite. Natural graphite can be obtained from J. T. Baker Inc., Phillipsburg, N.J. as Graphite (96%) (325 Mesh). Synthetic graphite can be obtained from Superior Graphite Co., Chicago, Ill. as Synthetic Purified Graphite, No. 5535 and No. 5539. Suitable conductive (i.e. $10^{-6}$ to $10^{-4}$ OHM-CM) metals include aluminum, copper, iron, nickel, zinc, magnesium, gold, silver, tin and stainless steel. Suitable semiconductor materials (i.e. $10^{-4}$ to 1 OHM-CM) include silicon carbide, silicon, ferrites and metal oxides such as tin oxide and ferrous oxide. It should be noted that some metals (such as aluminum) and some semiconductors (such as silicon) will react with the sodium silicate and care must be taken to ensure performance. Also, many of the so-called magnetic materials include a resistive component which facilitates their heating in a microwave field. Magnetic heating is not an object of this invention as it typically requires relatively thick coatings and metal substrates for optimal performance, although some magnetic heating may occur in some coating materials of this invention.

The active particles preferably have a maximum dimension and shape which allows for coating the coating material in the preferred thickness range. The active particles more preferably have a maximum dimension below about 100 microns. Even more preferred is a particle size of less than 50 microns for ease of coating and uniformity. Particle geometry should be such that contact between particles is facilitated. Virtually any particle shape can work if the particles are included in the right quantity. However, certain shapes are preferred because they seem to facilitate contact between particles. For example, particles with a significant aspect ratio, i.e., above 10:1 are preferred. Other particle characteristics may be important with respect to thermal shut down. For example, activated charcoal seems to interlock reducing the tendency to shut down. In contrast, printing grade carbon which is relatively smooth tends to readily permit shut down. Shut down will be discussed more fully hereinafter.

More preferred ranges depend upon the type of performance desired from the susceptor. For example, a particular application may require high heating performance while another application may require only moderate heating performance. Heating performance can be characterized in terms of an Energy Competition Test discussed below. This Test has been developed to determine the heating characteristics of susceptors (at least relative to other susceptors) when they are in competition with a load. The results of this Test are measured in terms of the change in temperature over 120 seconds resulting from the susceptor (hereinafter ΔT120). To conduct the Energy Competition Test, place a 150 ml Pyrex beaker containing 100 grams of distilled water in a carousel microwave oven having a 30 BTU/minute power rating as measured with a 1000 gram water load. Also place on the carousel a three and three quarter inch diameter Pyrex petri dish containing 30 grams of Crisco™ Oil. A petri type dish having taller sides may be used if necessary to hold thicker susceptors. These items are placed about nine inches on center apart in competition with each other. Take an initial temperature reading of the oil. Subject these items to the full power of the microwave field for a total of 120 seconds; at 30 second intervals open the microwave oven and stir the oil with a thermocouple, measuring and recording the temperature. This measurement should be taken as quickly as possible to minimize cooling of the oil. This procedure provides a control.

Repeat the above procedure with a three and one half inch diameter sample, e.g., a removed section of a foamed silicate microwave susceptor tile 20 of FIG. 2 completely submerged in the oil. Begin with the oil at about the same initial temperature as with the control (i.e., about 70° F.) (21.1° C.). It may be necessary to place an inert weight, such as a glass rod, on top of the susceptor to keep it submerged in the oil. The data can be normalized by adjusting the initial temperature to a standard 70° F. (21.1° C.). by subtracting or adding the initial temperature deviation from 70° F. (21.1° C.), to each of the temperatures recorded.

Once the test has been run, one method which can be used for comparison of the power of various microwave susceptors is to compare the change in temperature over the two minute time interim. Thus, the 120 second ΔT for a given susceptor (hereafter ΔT120) is calculated by subtracting the 120 second ΔT of the oil alone from the 120 second ΔT of the oil and susceptor. Additionally, the two minute ΔT of the susceptor is normalized by adding or subtracting any initial temperature variance of the oil from 70° F. (21.1° C.).

As with measuring RAT through the use of a network analyzer, the Energy Competition Test may not predict exactly how well a susceptor will heat in the microwave in conjunction with a particular food load. The greater the variance in microwave properties of the actual food load from the properties of the water load, the less accurate this test may be for predicting actual performance in a particular application. However, the use of water is intended to simulate the susceptor in competition with a load and provides a valid comparative measurement tool.

As used herein a susceptor exhibiting moderate heating performance generates a $\Delta T120$ of from about 75° F. (23.9° C.) to about 200° F. (93.3° C). In contrast, a susceptor exhibiting high heating performance generates a $\Delta T120$ above about 200° F. (93.3° C.). A 200° F. (93.3° C.) $\Delta T120$ corresponds to slightly greater than the $\Delta T120$ of thin film susceptors.

Once mixed, MAC 22 can be coated onto the substrate 21 in any desired manner. For example, printing, painting, spraying, brushing, and Mayer rods could all be acceptable ways of coating the MAC onto a substrate. MAC 22 could be laid down, as a continuous mass or in a variety of patterns to best suit the needs of the product to be heated, provided such that there is a sufficient surface concentration of the active constituent to enable the desired heating.

The MAC preferably has a surface concentration of the active constituent of about 1.0 gram per square meter or greater for graphite. More preferably, the surface concentration of the active constituent is from about 1.0 gram per square meter to about 100 grams per square meter; and most preferably from about 2.0 grams per square meter to about 30 grams per square meter. For poorer conductors (i.e., $>10^{-3}$ ohms per square) and for more dense materials (i.e., $>2.5$ g/cm$^3$) the preferred range is generally above 100 g/m$^2$. MAC preferably has a surface concentration of the active constituent of about 4.0 gram per square meter or greater for stainless steel. More preferably, the surface concentration of the active constituent is from about 4.0 gram per square meter to about 400 grams per square meter; and most preferably from about 8.0 grams per square meter to about 120 grams per square meter. For poorer conductors (i.e., $>10^{-3}$ ohms per square) and for more dense materials (i.e., $>2.5$ g/cm$^3$) the preferred range is generally above 400 g/m$^2$. Recognize that higher temperatures generally result when the surface concentration of the active constituent for a given coating material is increased. The surface concentration of the active constituent can be determined by subtracting the initial substrate weight from the combined substrate and coating weight. Also, determine the water content of the MAC. Knowing the water content, the weight of the coating material (MAC), the weight ratios between the silicate solids and the active and any other additive, the weight of the active in the MAC can be determined. This weight is then divided by the total coated area to give the dimensional units, grams per meter squared.

The thickness of the MAC is governed somewhat by the active constituent surface concentration in the MAC. This is not completely true because different substrates will hold different amounts of the dry layer within their boundaries resulting in different gross measurements. For example, if the MAC is coated onto a porous silicate foam substrate, the same amount of material would have a smaller gross measurement than if it were directly coated onto a non-porous silicate foam substrate due to absorption into the substrate. In fact, performance may suffer if too much coating material is absorbed. Generally speaking the measured thickness of the MAC is preferably less than about 0.020 inches (0.05 cm). Thicker layers will work but will become more expensive and cumbersome with no real added benefit. More preferably, the thickness of the dry layer is from about 0.0001 inches (0.00025 cm) to about 0.010 inches (0.025 cm), and most preferably from about 0.0005 inches (0.00127 cm) to about 0.006 inches (0.015 cm).

The MAC preferably has an initial resistivity from about 2 ohms per square to about 20,000 ohms per square; more preferably from about 10 ohms per square to about 5,000 ohms per square; and most preferably from about 30 ohms per square to about 800 ohms per square. One method of measuring surface resistivity utilizes a conductivity probe such as an LEI Model 1300MU Contactless Conductivity Probe which may be purchased from Lehighton Electronics, Inc., Lehighton, Pa. Prior to taking a measurement the instrument is zeroed. To take a measurement the sample is placed under the measurement transducer. The resistivity is then read from the digital display in MHOS per square and inverted to give ohms per square. It should be understood that measuring the resistivity alone by this method cannot distinguish between an electrically continuous layer and a capacitive layer.

The microwave active coating material can be dried in many ways. For example, the coating can be ambient dried, i.e., left to dry at room temperature, or the coating can be oven dried to a target moisture content. The coating should be dried to a point at which the coating material is relatively stable. The moisture content of the dry layer is preferably about 25% or less, more preferably less than about 2%.

As noted earlier, the absorption, reflection, transmission and resistivity of the MAC containing more than about 2% water can change upon exposure to microwave energy field. Although not wishing to be bound by this theory, it appears one reason for this change in characteristics is due to volumetric expansion of the silicate. Upon heating the water in the silicate vaporizes and forms bubbles. Above about 200° F. (93.3° C.) the silicate matrix softens allowing the escaping water vapor to initiate foaming of the silicate causing it to expand. As the silicate expands the electrical quality of the contact between the individual active particles decreases. Consequently, the resistance of the dry coating increases. Depending upon where the susceptor started on the RAT three component diagram of FIG. 1, heating will either increase or decrease due to this change. Generally, as resistance increases, heating decreases and the susceptor begins to shut down; i.e., the amount of heat it produces decreases.

Another phenomenon which may cause the susceptor to shut down has to do with the relative rates of thermal expansion between the substrate and the dry layer. If the substrate expands significantly more rapidly than the dry layer upon heating, discontinuities or partial cracks may result in increased resistivity of the dry layer. Based on R-A-T analysis and FIG. 1, it appears these cracks do not cause the MAC to become electrically discontinuous.

Regardless of the cause, shut down is often advantageous. For example, shut down provides controlled heating for some applications. This is true for example, where moderate heating performance is desired such as when less heat is required near the end of a cooking cycle, or when a paper substrate is used near the susceptor. In fact, the MAC of the present invention can be formulated to shut down at temperatures very close to the point which a paper, other substrate, or food would char. On the other hand, shut down is undesirable in some applications; specifically, when high heating performance is required in the particular application. Above these temperatures foods requiring high temperatures can be effectively cooked or baked such that a relatively traditional appearance and texture is achieved. Examples of foods requiring such temperatures include foods with high moisture content such as baked goods; i.e., cupcakes, muffins and brownies.

Shut down due to volumetric expansion of the MAC silicate binder can be reduced or nearly eliminated by drying the MAC to less than about 2% water. Drying the MAC to water contents between 2% and 25% will result in some increasing degree of shut down by the MAC. If MAC shutdown is desired, the amount of water left in the MAC should be adjusted depending on the cooking application and conditions.

The following non-limiting examples illustrate the versatility of the present invention.

EXAMPLE 1

Figure 4:
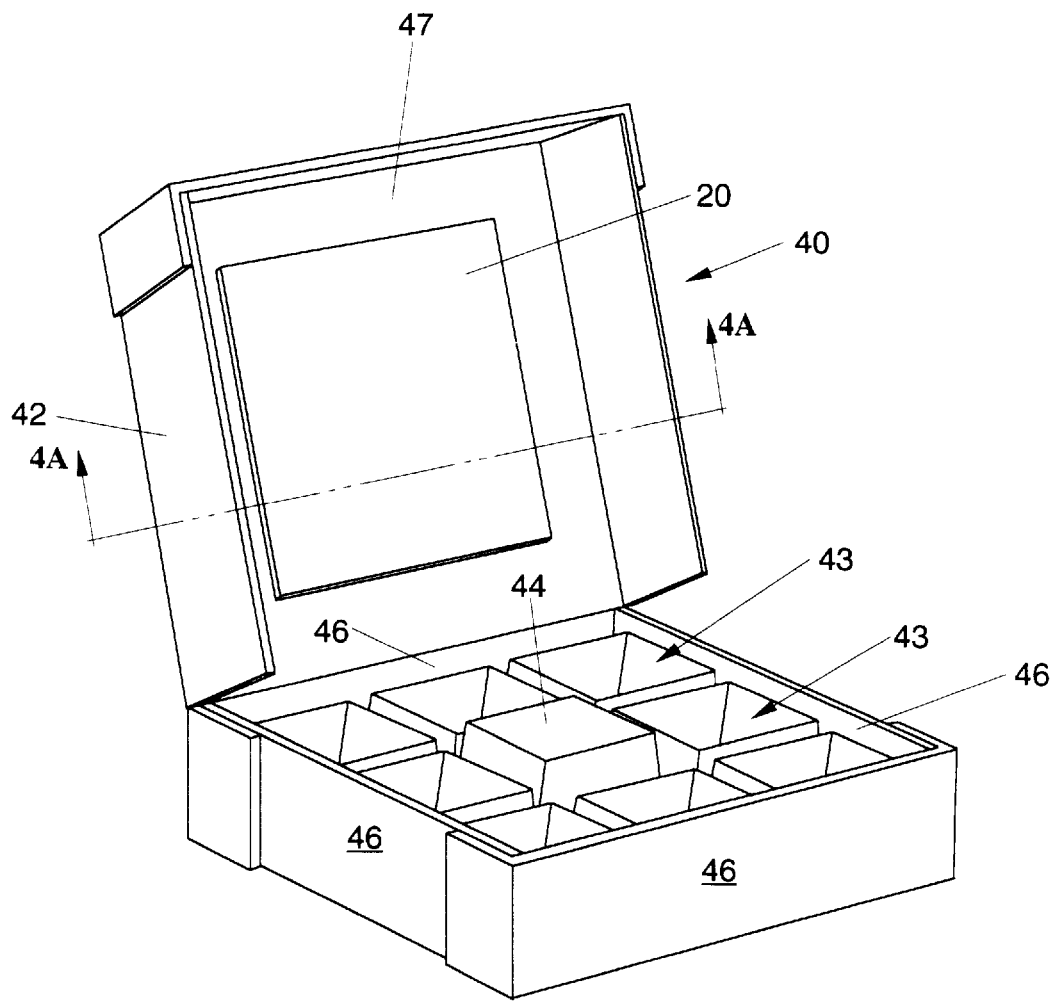
FIG. 4 is a perspective view of a preferred embodiment incorporated into a microwave susceptor package for cooking cupcakes.

Referring to FIG. 4

Referring to FIG. 4, a beneficial use of foamed silicate susceptors of this invention is for heating a plurality of baked goods such as muffins or similar items. The baking box 40 is covered by top 42 which comprises a paperboard sheath 47 and the foamed susceptor tile 20.

Referring to FIG. 2, the foamed susceptor tile 20 comprises MAC 22 which is prepared by mixing 405.41 grams of 3.22 ratio sodium silicate solution having 37% solids with 100 grams of synthetic graphite powder. The sodium silicate may be purchased from Power Silicates Inc., Claymont, Del. as F grade solution sodium silicate. The graphite may be purchased from Superior Graphite Company, Chicago, Ill. as #5539 Superior Synthetic Graphite. The components are hand mixed in a glass jar using a stainless steel spatula. Stirring is continued until all lumps are dispersed and the sample is uniformly mixed. The weight of the sodium silicate solution (grams) times the percent solids divided by 100 ratioed to the weight of graphite equals the silicate-:graphite weight ratio on a dry basis. This calculation based upon the above amounts results in a liquid MAC 22 having an 60:40 silicate/graphite weight ratio (dry basis).

Referring to FIG. 2 the MAC 22 is applied to the foam tile 21 using an ordinary paint roller leaving an approximate 0.5 inches (1.27 cm.) of foam tile 21 uncoated around its perimeter. Ordinary masking tape is used to protect the perimeter from being coated, and then was promptly removed. The foam tile 21 coated with the MAC 22 was then dried at about 400° F. (204.4° C.) for about 1 hour. The dried weight of the MAC 22 was about 1.5 grams which is equivalent to approximately 15.5 gms/m$^2$ of the active constituent. The dried MAC 22 was electrically continuous with a resistivity of about 200 ohms per square as derived from the RAT relationship illustrated in FIG. 1.

Referring to FIG. 2A the high temperature film 23 is a 6 mil (0.01524 cm) thick Teflon™ film that covers the MAC 22, wrapping around foam tile 21 and secured with adhesive tape 24.

Figure 4A:
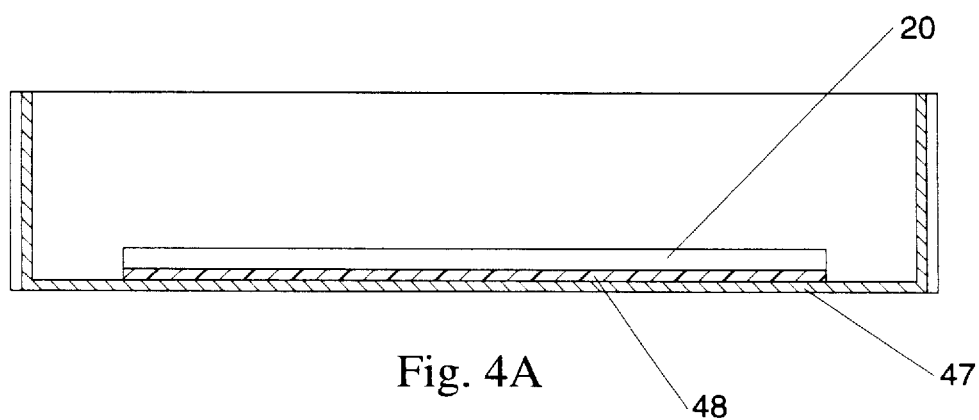
FIG. 4A is an enlarged cross sectional view taken along line 4A—4A of FIG. 4.

Referring to FIG. 4A, the foamed silicate susceptor 20 can be affixed to the paperboard sheath 47 by a variety of means such as using double-faced adhesive tape 48 or paperboard tabs (not shown).

A Duncan Hines™ yellow cake batter might be baked in these microwave susceptor baking cups 43. Forty grams of yellow cake batter is placed in each of the eight baking cups 43. The baking cups 43 are 2 inch (5.08 cm) diameter by 1¼ inch (3.175 cm) commercially available thin film susceptor baking cups and can be purchased from Ivex Inc., Madison, Ga. Referring to FIG. 4, the eight cups 43 are arranged around the perimeter of an approximately 8 inch (20.32 cm) by 8 inch (20.32 cm) by 1⅝ inch (4.1275 cm) tall card board baking box 40 with a lid 42, leaving the center void. A stack element 44 may be used. The baking box 40 is totally microwave transparent. Alternatively, the baking box 40 may have a microwave shield located on the side walls 46 forming a vertically disposed annular shield. The side wall 46 shield can be printed patterns of electrically conductive coating materials or commercially available shields. The cupcakes are baked four minutes on high power with a 180° rotation of the box after 1 minute in a 600 watt microwave oven with the baking box 40 and lid 42 closed.

The results of this baking method would be expected to yield good baking results. One critical feature to achieving acceptable cupcakes is moisture loss. Average moisture loss might be about 14%. Furthermore, appearance and texture should be similar to cupcakes baked in conventional ovens. Cupcakes baked as described above would exhibit good side rounding, doming & browned surface appearance.

It would be expected that the foamed silicate susceptor 20 described above would yield the following test results. The ΔT120 from the Energy Competition Test might be about 350° F. (176.7° C.). The initial RAT values would indicate all samples were electrically continuous as their values would lie on the RAT electrically continuous curve represented on the three component RAT diagram, FIG. 1. Similarly, RAT measurements taken after baking would indicate all samples remained electrically continuous after use. The R-A-T after baking might be about 40%–45%–15%.

EXAMPLE 2

High Heating Performance Baking System

Figure 3:
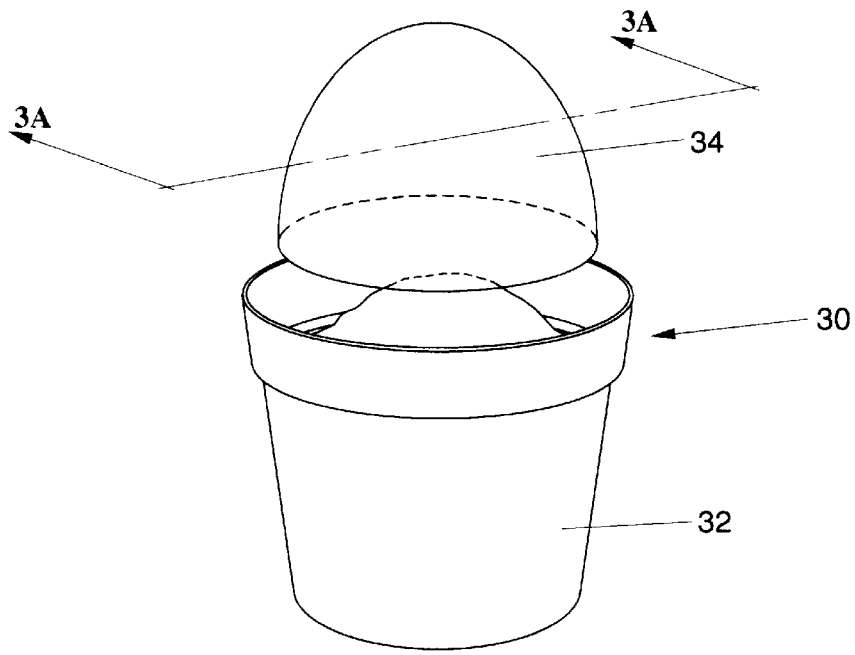
FIG. 3 is a perspective view of another embodiment of a foamed silicate susceptor of the present invention formed into a dome.
Figure 3A:
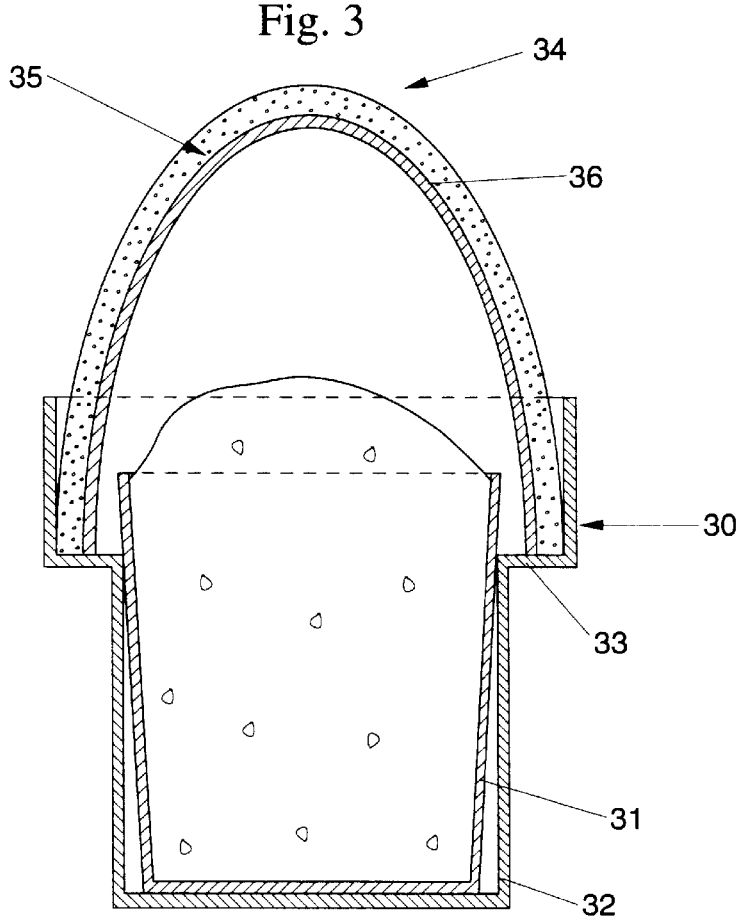
FIG. 3A is a cross-sectional view taken along line 3—3 of FIG. 3A—3A.

Referring to FIGS. 3 and 3A, another beneficial use of susceptors of this invention is for heating single muffins or similar items. This application is exemplary of a high heating performance susceptor. Essentially any standard formulation can be used. For example, a batter prepared from a dry mix such as the Duncan Hines® Blueberry Muffin Mix which has been commercially available can be used. Sixty grams of batter (including blueberries) is placed in a 2 inch (5.08 cm) diameter by 1¼ inch (3.175 cm) commercially available thin film susceptor baking cup 31. The initial height of the batter in the cup 31 is about one inch (2.54 cm). Such a thin film baking cup 31 can be purchased from Ivex Inc., Madison, Ga. To illustrate the versatility of this baking system the batter can be frozen in the susceptor baking cups 31 at approximately 0° F. (−17.8° C.).

The baking system 30 of this Example includes three components. The first component could be paperboard, Pyrex glass, or fiber reinforced foam base element 32 measuring approximately 2¾ inch (6.99 cm) diameter by 1⅜ inch (3.49 cm) high with a 3½ inch (8.89 cm) diameter flat lip around its top edge. The second component is the batter filled baking cup 31 which is placed in the base element 32. The third component of the microwave baking system is a fiber reinforced foam (35) dome 34 measuring approximately 3¼ inch (8.26 cm) diameter×1¾ inch (4.45 cm) high, which sits on the lip 33 of the base element 32. The inner surface of the dome has a high temperature MAC material 36 on the foam 35 of the present invention.

The high temperature coating material (MAC) 36 is made of sodium silicate, and graphite about 17.22 grams of a 3.22 ratio silicate solution having 37% solids is used. A 3.22 sodium silicate may be purchased from Power Silicates Inc., Claymont, Del. as "F" grade solution sodium silicate about 3.31 grams of synthetic graphite is added to the sodium silicate. The synthetic graphite may be purchased from Superior Graphite Co., Chicago, Ill. as #5539 Superior Synthetic Graphite. This mixture is then hand mixed as discussed in Example 1. Thus, the coating material 36 has a silicate:active weight ratio of about 65.8:34.2.

This MAC 36 formulation is coated onto the interior of the dome shaped substrate 35 by hand using a ½ inch (1.27 cm) wide brush to provide as uniform of a MAC 36 as possible. After drying at about 400° F. for about 1 hour, its loading of active (graphite) would be from about 22.5 g/m² to about 24.5 g/m². The thickness of the MAC 36 is in the range of from about 0.001 inch (0.00254 cm) to about 0.003 inch (0.00762 cm).

The frozen blueberry muffin batter containing microwave susceptor cup 31 is placed inside the glass, paper, or reinforced foam base element 32 and the dome 34 is placed over the batter as seen in FIG. 3A. This baking system 30 is then placed inside a 615 watt 35 BTU/minute (based on a 1000 gram water load) microwave oven for 1½ minutes on high power.

The batter might have about a 12% moisture loss and rise to about 2.0 inches (5.08 cm) in height. Furthermore, the muffin have a nicely browned top surface and good flavor, moistness and texture.

It would be expected that the dome 34 coated with the MAC 36 would provide the following test results. A ΔT120 of 375° F. (190.6° C.) as measured by the Energy Competition test. A R-A-T reading of 38%–49%–13% which indicates electrically continuous both initially and after use indicating that the coating material is and remains electrically continuous and does not degrade.

EXAMPLE 3
Microwave Frying of Sausage

Figure 5:
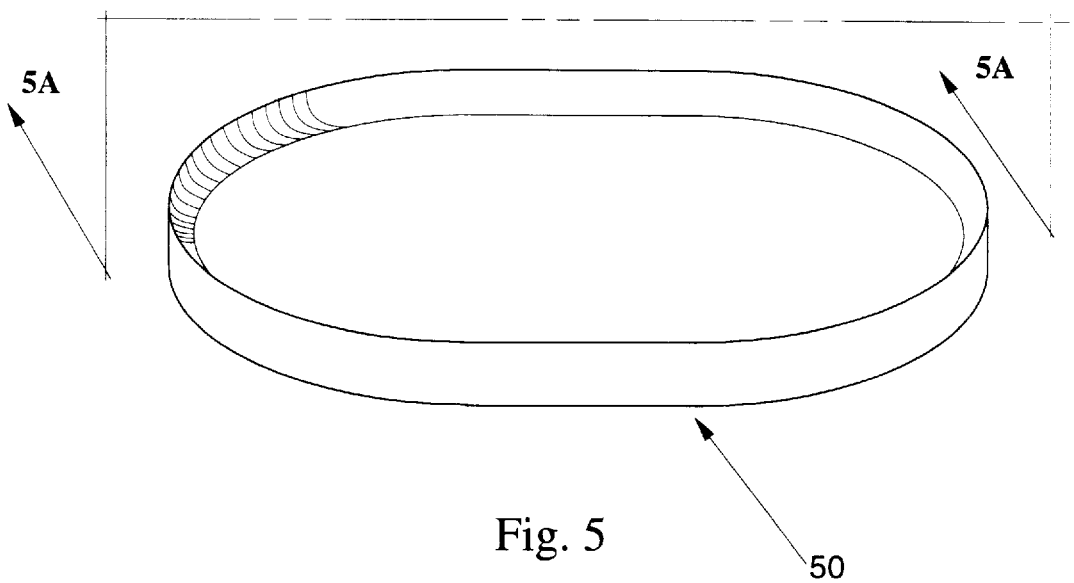
FIG. 5 is a perspective view of an additional preferred embodiment of a microwave susceptor of the present invention which can be used for frying.
Figure 5A:
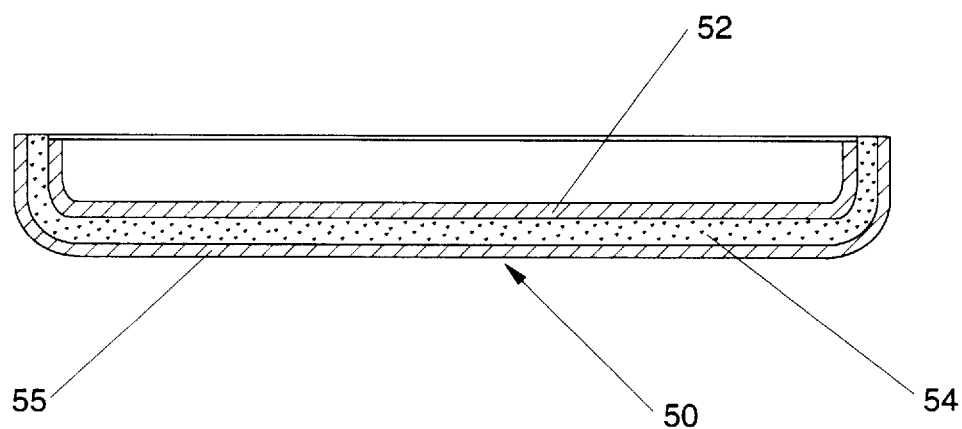
FIG. 5A is a cross-sectional view taken along line 5A—5A of FIG. 5.

Referring to FIGS. 5 and 5A, two fresh sausage links are fried using a simulated foamed silicate frying pan 50 coated with a MAC material 52 of the present invention. This application is exemplary of a high heating performance susceptor. The MAC 52 of this consists of 3.22 sodium silicate and nickel flakes in a 35/65 weight ratio. This coating is created by mixing 19.9 grams of 3.22 sodium silicate solution having 37% solids with 13.6 grams nickel flakes. The 3.22 sodium silicate can he purchased from Power Silicates Inc., Claymont, Del. as F Grade Solution sodium silicate. The nickel may be purchased from Novamet Company, Wyckoff, N.J., as Nickel HCA-1 flakes. This results in a dry weight ratio of 35:65 of silicate to active.

The simulated frying pan 50 is created by coating the MAC material 52 on the inside bottom of a formed foamed silicate substrate 54 which is approximately 3¾ inch diameter. A formed paperboard outer cover 55 is used to provide strength and stability to the tray. A ½ inch (1.27 cm) brush is used to coat the substrate 54 by hand as uniformly as possible. The MAC 52 is dried at about 400° F. (204.4° C.) for about 1 hour. The MAC 52 has a thickness in the range of about 0.001 inches (0.00254 cm) to about 0.003 inches (0.00762 cm). The surface concentration of the active in the MAC 52 would be about 291 g/m².

Two sausage links having an initial weight of about 55 grams are placed in the simulated frying pan 50. Bob Evans Farms™ small casing links can be used. The links are cut in half to provide four links which fit side by side in the susceptor frying system 50. In addition, eight grams of Crisco Oil™ are placed in the frying system 50. The sausage is heated for 1 minute and 45 seconds in a 615 watt G.E. microwave oven, without preheating the oil or the simulated frying pan 50. At one minute fifteen seconds the sausage is turned over to brown the other side for the last thirty seconds.

The sausages are well browned on both sides and have a weight loss of about 22%. The eating quality is very good and include a browned flavor. The simulated frying pan 50 provides the following test results: A ΔT120 of about 248° F. (120° C.) and a R-A-T of 78%–20%–2% and it remains electrically continuous.

EXAMPLE 4

Dry sodium silicate foam tile substrates are excellent for a microwave active coating. The foam tiles offer several advantages in a microwave Blueberry muffin prototype. The foam tiles: 1) Are non-combustible and are capable of withstanding temperatures in excess of 1000° F. (537.8° C.). 2) Provide thermal insulation for the package. 3) Has a low specific heat which allows for rapid microwave heating and a low thermal heat transfer capacity which reduces the chance of the consumer getting seriously burned. 4) Have a low density which results in a lower package weight. 5) Are moldable and can be used in a variety of packages. 6) Are transparent to microwave energy. 7) May be reusable if desired.

Foam Tile Formulation

The foam tile has the following formulation.

Note: The tile is based on a 60 gram solids basis and with a 45/55 ratio of G-silicate to F-Silicate on a wet basis.

| Wet Basis | Dry Basis | Normalized |
|---|---|---|
| 47.55 grams G-Silicate @ 80.89% solids = | 38.46 grams | 64.10% |
| 58.11 grams F-Silicate @ 37% solids = | 21.50 grams | 35.83% |
| 11.74 grams distilled water | — | — |
| 0.149 grams S.A.S.S. @ 29% active = | 0.0432 grams | 0.072% |

Note:
G-Silicate is a 3.22 ratio sodium silicate powder from the PQ Corp.
F-Silicate is a 3.22 ratio sodium silicate solution from the Power Silicate Inc.
S.A.S.S. is a Sodium Laurylsulfate solution.

The Dry Foam Tile Mold

Figure 6:
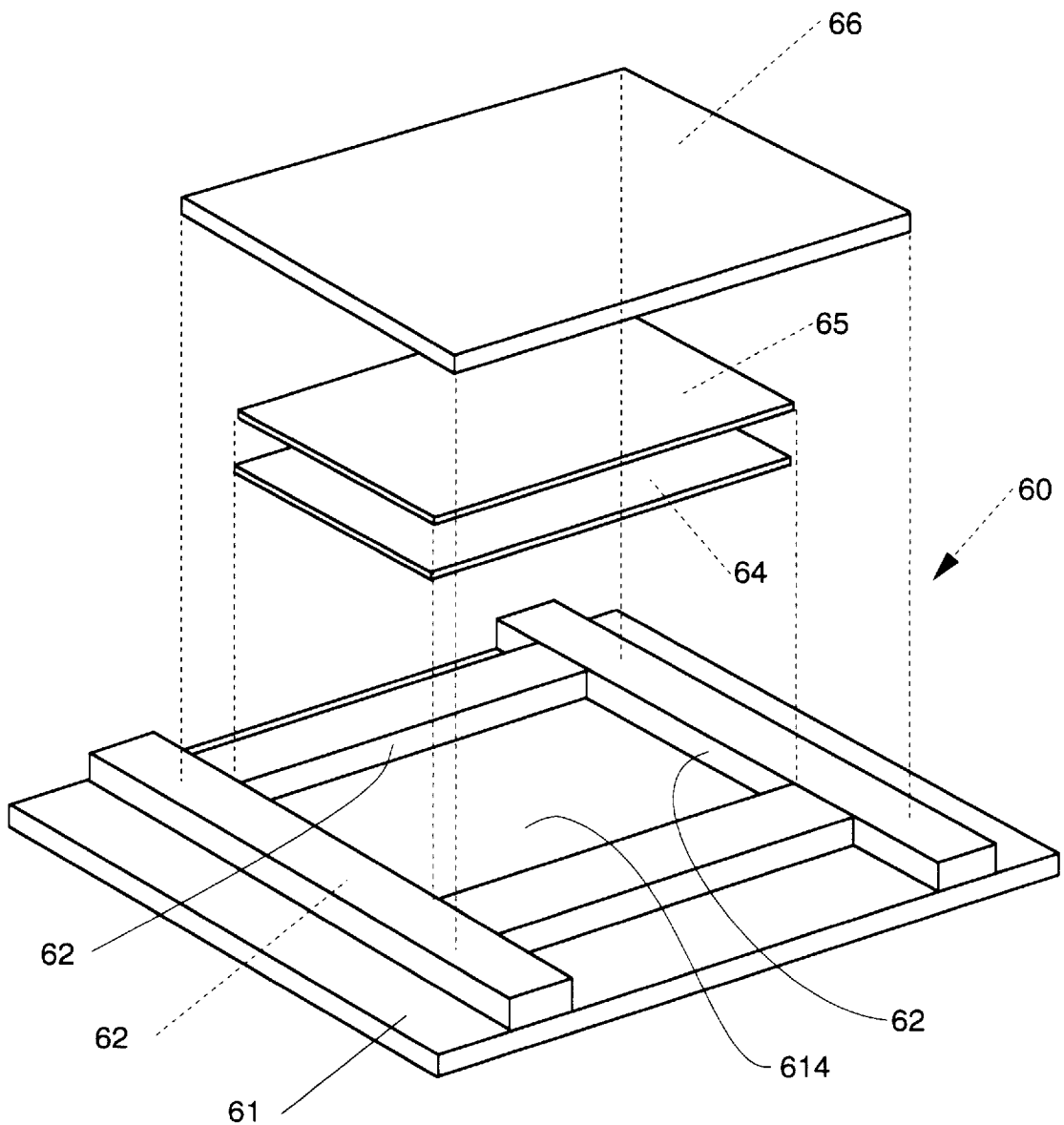
FIG. 6 is a perspective view of a mold used to make foam substrates similar to 21 of FIG. 2.

FIG. 6 is an exploded view drawing of mold 60. Its inside dimensions are 8¼ (20.96 cm)×8¼ (20.96 cm)×5/16 (0.79 cm) inches (L×W×H). The mold 60 uses silicone coated liners 64 & 614 cut to fit the inside dimensions of the mold 60 which serve as an aid to release the foam tile 21 of FIG. 2 from the mold. The liners 64 & 614 are EKCO brand BAKER'S SECRET coated metal cookie sheets. The sides 62 of the mold are covered with Tempr-R-Glas tape, type A2207 from CHR Industries (not shown). This a Teflon impregnate fiberglass cloth with a silicone adhesive on one side.

The liners 64 & 614 are seasoned prior to use. Seasoning of the liners 64 & 614 provides a minute oil film between the silicate slurry of Example 4 and the liners 64 & 614 which aid in the release of the tile foam 21 from the mold. Without a film barrier silicate foam will stick to the liners 64 & 614 when dried. Lou Anne Cottonseed stearin hardstock with an Iodine Value of 3 serves as the seasoning for the liners. The hardstock is melted and brushed onto the previously warmed liners 64 & 614 and immediately wiped off, and allowed to cool. A slight waxy haze on the liners should be perceptible.

Foam Tile Preparation Procedures
1) Season the liners 64 & 614 as stated above
2) Referring to FIG. 6, assemble the mold 60 which includes the based plate 61, bottom liner 614, and sides 62.
3) Level the entire mold using a leveling board.
4) Prepare the silicate slurry of Example 4 as follows:
   a) add the silicate-G powder to a large crystallizing dish
   b) add the silicate-F solution
   c) add the additional distilled water
   d) mix well with a spatula
   e) add the S.A.S.S. solution of Example 4 dropwise via syringe
   f) mix the entire slurry well with a spatula.

5) Pour the silicate slurry into the mold 60. The mold provides head space for expansion.
6) Spread the slurry out evenly in the mold using a plastic fork in a raking action.
7) Allow to stand undisturbed for 30 to 60 minutes depending on room temperature and humidity. The slurry will partially set-up and become firm.
8) Place the top liner (64), on top of the silicate slurry.
9) Place the floating ceiling (65) which serve as a weight on top of the liner 64.
10) Place the cover (66), on the mold and secure.
11) Place the entire mold into a pre-heated convection oven set at 500° F. (260° C.) and bake for a minimum of (2) hours.
12) Removed the entire mold from the oven and allow to cool.
13) Disassemble the mold and remove the foamed tile.
14) Clean the tile by washing it in an ordinary dishwasher to remove any traces of the oil film seasoning, followed by drying in an oven at approximately 500° F. (260° C.).

The foam is about 0.3" in thickness. The bottom surface is smoother than the top, but both surfaces are relatively smooth. The MAC is applied to the smoothest surface.

EXAMPLE 5

The same as Example 1 except 350 grams of stainless steel flakes are used instead of the graphite powder.

The stainless steel flakes may be purchased from Novamet Company, Wyckoff, N.J., as Stainless Steel Std. Water Grade Flakes. Referring to FIG. 2 the MAC 22 is applied to the foam tile 21 using ordinary paint roller leaving an approximate 0.5 inches of foam tile 21 uncoated around its perimeter. Ordinary masking tape is used to protect the perimeter from being coated, and then promptly removed. The foam tile 21 coated with the MAC was then dried at about 400° F. for about 1 hour. The dried weight of the MAC 22 was about 1.8 grams which is equivalent to approximately 25.4 gms/m2 of the active constituent. The dried MAC 22 is electrically discontinuous with RAT values of 81%–8%–11%.

The cupcakes brown as in Example 1.

What is claimed:

1. A process for making a dry dielectric silicate foamed microwave susceptor comprising the following steps:
   a) preparing pourable aqueous alkali metal dielectric silicate slurry;
   b) pouring said slurry into a smooth surface substrate mold;
   c) heating said poured slurry at an effective elevated temperature to foam the slurry in said mold;
   d) drying said foam at an effective elevated temperature to provide a dry dielectric silicate foam substrate having a moisture level of from 0% to 5%, by weight of dry foam, and having at least one substantially smooth surface;
   e) coating at least a portion of said substantially smooth surface with a flowable microwave active coating, said microwave active coating comprising an alkali metal silicate binder and a microwave active constituent; and
   f) drying said flowable coating at an effective temperature to form a dry microwave active coating layer and wherein said dry layer of microwave active coating has a surface concentration of said active constituent of at least about 1.0 gram per square meter.

2. The process of claim 1 wherein said dry dielectric silicate foam substrate is $SiO_2:Na_2O$ having a weight ratio of from about 1.6:1 to about 3.75:1 and wherein said substrate contains from 0 to about 25% non-silicate reinforcing material.

3. The process of claim 1 wherein the dry dielectric silicate foam substrate is a tile.

4. The process of claim 1 wherein said dry dielectric silicate foam substrate is in the form of a dome.

5. The process of claim 1 wherein said drying temperature of step (d) is from about 450° F. to about 550° F.

6. The process of claim 1 wherein said dry dielectric silicate foam substrate has a moisture content of from about zero to about 2%.

7. The process of claim 1 wherein said dry dielectric silicate foam substrate has a thickness of from about 0.05 inch to about 1 inch.

8. The process of claim 1 wherein said dry dielectric silicate foam substrate has a thickness of from about 0.1 inch to about 0.7 inch.

9. The process of claim 1 wherein said dry dielectric silicate foam substrate has a thickness of from about 0.2 inch to about 0.5 inch.

10. The process of claim 1 wherein said dry dielectric silicate foam substrate comprises a surfactant foaming aid at a dry foam weight basis level of from about 0.02% to about 1%.

11. The process of claim 1 wherein the dry dielectric silicate foam substrate is selected from the group consisting of sodium silicate, potassium silicate, lithium silicate and mixtures thereof.

12. The process of claim 1 wherein the silicate binder is selected from the group consisting of sodium silicate, potassium silicate, lithium silicate and mixtures thereof; and wherein said dry microwave active coating layer has a dry moisture content of from about 0 to about 25% and an initial resistivity from about 2 ohms per square to about 20,000 ohms per square.

13. The process according to claim 12 wherein said dry microwave active coating layer moisture content is from about 0 to about 5%.

14. The process according to claim 12 wherein said dry microwave active coating layer moisture content is from about 0 to about 2%.

15. The process according to claim 1 wherein said dry microwave active coating layer has a thickness between about 0.0001 inches and about 0.020 inches.

16. The process according to claim 1 wherein the dry microwave active coating layer has an initial resistivity of from about 10 ohms to about 5,000 ohms per square.

17. The process according to claim 1 wherein said silicate binder to said active constituent of the microwave active coating material have a weight ratio of from about 98:2 to about 40:60; said dry layer being electrically continuous and having a surface concentration of said active constituent of at least about 1.0 gram per square meter; said active having a density of from about 1.7 to about 2.5 grams per cc.

18. The process according to claim 17 wherein said silicate binder to said active constituent of the microwave active coating material have a weight ratio of from about 98:2 to about 90:10.

19. The process according to claim 17 wherein said silicate binder to said active constituent of the microwave active coating material have a weight ratio of from about 90:10 to about 80:20.

20. The process according to claim 17 wherein said silicate binder to said active constituent of the microwave active coating material have a weight ratio of from about 80:20 to about 40:60.

21. The process according to claim 1 wherein said silicate binder to said active constituent of the microwave active coating material have a weight ratio of about 98:2 to about 15:85; said dry layer being electrically continuous and having a density of from about 7.5 to about 8.5 grams per cc.

22. The process according to claim 21 wherein said silicate binder to said active constituent of the microwave active coating material have a weight ratio of from about 70:30 to about 50:50.

23. The process according to claim 21 wherein said silicate binder to said active constituent of the microwave active coating material have a weight ratio of from about 92:2 to about 70:30.

24. The process according to claim 21 wherein said silicate binder to said active constituent of the microwave active coating material have a weight ratio of from about 50:50 to about 15:85.

25. The process according to claim 1 further comprising a thermally resistive cover layer adjacent said dry layer of microwave reactive coating material whereby the dry layer is interposed between said cover layer and said foam substrate.

26. The process according to claim 1 wherein said microwave active constituent is a particulate material.

27. The process according to claim 1 wherein said microwave active constituent is electrically non-continuous.

28. A method of making a microwave foam silicate susceptor comprising the steps of:
   a) preparing a wet pre-foam slurry comprising water, alkali metal silicate, and surfactant;
   b) pouring the wet pre-foam slurry into a substrate mold having at least one smooth surface;
   c) heating the slurry at a temperature of from about 450° F. to about 550° F. to form a dry alkali metal silicate foam substrate having at least one having a substantially smooth surface;
   d) coating at least a portion of the dry alkali metal silicate foam substrate with a microwave active coating comprising alkali silicate binder and microwave active constituent; and
   e) drying the microwave active coating; and
wherein the surfactant in the slurry is present in an amount sufficient to provide the dry alkali metal silicate foam substrate with from about 0.02% to about 1%, by weight, surfactant.

29. A method according to claim 28 further comprising, prior to pouring the wet pre-foam slurry into the mold, the steps of:
   a) lining the mold with silicone coated liners; and
   b) seasoning the liners with an oil film.

30. A method according to claim 28 wherein the slurry comprises surfactant in an amount sufficient to provide the dry alkali metal silicate foam substrate with from about 0.02% to about 0.04%, by weight, surfactant.

31. A method according to claim 28 wherein the microwave foam silicate susceptor is capable of maintaining temperatures of at least 1000° F.

32. A method according to claim 28 wherein the dry alkali metal silicate foam substrate has a moisture level of from about 0% to about 2%, by weight.

* * * * *